United States Patent
Kwon et al.

(10) Patent No.: US 9,994,126 B2
(45) Date of Patent: Jun. 12, 2018

(54) SYSTEM AND CONTROL METHOD FOR PREVENTING INTERFERENCE BETWEEN FRONT AND REAR SEATS FOR VEHICLE

(71) Applicants: Hyundai Motor Company, Seoul (KR); Kia Motors Corporation, Seoul (KR)

(72) Inventors: Mi-Sun Kwon, Seoul (KR); Dong-Woo Jeong, Gyeonggi-do (KR); Tae-Hoon Lee, Seoul (KR); Ji-Hee Han, Gyeonggi-do (KP); Deok-Ki Kim, Seoul (KR); Ho-Cheoul Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 15/343,060

(22) Filed: Nov. 3, 2016

(65) Prior Publication Data
US 2017/0158087 A1 Jun. 8, 2017

(30) Foreign Application Priority Data
Dec. 4, 2015 (KR) .......................... 10-2015-0172583

(51) Int. Cl.
*B60R 22/00* (2006.01)
*E05F 15/00* (2015.01)
(Continued)

(52) U.S. Cl.
CPC ......... *B60N 2/0244* (2013.01); *B60N 2/0232* (2013.01); *B60N 2/06* (2013.01); *B60N 2/22* (2013.01); *B60N 2002/0272* (2013.01)

(58) Field of Classification Search
CPC ......... B60N 2002/0272; B60N 2/0244; B60N 2/22; B60N 2/0232; B60N 2/06
See application file for complete search history.

(56) References Cited

U.S. PATENT DOCUMENTS

| 4,852,934 A | 8/1989 | Yasuda et al. |
| 5,292,178 A | 3/1994 | Loose et al. |
| (Continued) | | |

FOREIGN PATENT DOCUMENTS

| JP | 02-256530 A | 10/1990 |
| JP | 03-189244 A | 8/1991 |
| (Continued) | | |

*Primary Examiner* — Imran Mustafa
(74) *Attorney, Agent, or Firm* — Mintz Levin Cohn Ferris Glovsky and Popeo, P.C.; Peter F. Corless (57) ABSTRACT

A system and a control method can prevent interference between front and rear seats for a vehicle, and allow reclining control and slide control for the front and rear seats to be performed, to control a seat back rearward movement angle of a front seat based on a seat back angle of the front seat, a position of the rear seat, and an interval between the front and rear seats at the time of rearward reclining control for the front seat, control a rearward slide movement distance based on the seat back angle of the front seat at the time of rearward slide control for the front seat, and calculate in advance a likelihood that interference will occur between the front and rear seats so as to stop the control operation at the time of performing a rearward reclining control operation and a rearward slide control operation.

14 Claims, 5 Drawing Sheets

(51) Int. Cl.
*G05D 1/00* (2006.01)
*G05D 3/00* (2006.01)
*G06F 7/00* (2006.01)
*B60N 2/02* (2006.01)
*B60N 2/06* (2006.01)
*B60N 2/22* (2006.01)

(56) References Cited

U.S. PATENT DOCUMENTS

2003/0230880 A1* 12/2003 Yasui ................ B60R 21/01534
    280/735
2016/0332538 A1* 11/2016 Rocha ..................... B60N 2/06

FOREIGN PATENT DOCUMENTS

| | | | |
|---|---|---|---|
| JP | 2003-080982 A | | 3/2003 |
| JP | 2003-285673 A | | 10/2003 |
| JP | 2004-203122 A | | 7/2004 |
| JP | 2005-119340 A | | 5/2005 |
| JP | 2005119340 A | * | 5/2005 |
| JP | 2007-167146 A | | 7/2007 |
| JP | 4186207 B2 | | 11/2008 |
| JP | 2011-222581 A | | 11/2011 |
| JP | 2015-221640 A | | 12/2015 |
| KR | 1998-036449 A | | 8/1998 |
| KR | 10-1998-0083798 A | | 12/1998 |
| KR | 20-2000-0010104 U | | 6/2000 |
| KR | 2003-0015939 A | | 2/2003 |
| KR | 10-2011-0071613 A | | 6/2011 |
| KR | 10-1123437 B1 | | 3/2012 |
| KR | 10-2014-0011833 A | | 1/2014 |

* cited by examiner

FIG. 5

SYSTEM AND CONTROL METHOD FOR PREVENTING INTERFERENCE BETWEEN FRONT AND REAR SEATS FOR VEHICLE

CROSS-REFERENCE TO RELATED APPLICATIONS

This application claims under 35 U.S.C. § 119(a) the benefit of Korean Patent Application No. 10-2015-0172583, filed on Dec. 4, 2015 in the Korean Intellectual Property Office, the entire contents of which are incorporated by reference herein.

BACKGROUND

1. Technical Field

The present invention relates to a system and a control method for preventing interference between front and rear seats for a vehicle, and more particularly, to a technology that allows reclining control and slide control for seats of the vehicle.

2. Description of the Related Art

In general, seats are disposed in two rows in a passenger vehicle, and seats may be disposed in three or more rows in a recreational vehicle (RV) or a sport utility vehicle (SUV).

Typically, a seat for a vehicle is configured such that a condition of the seat may be changed to correspond to driving positions that vary with a body condition of an occupant including a driver, that is, a body size, habits, or the like.

To this end, a reclining seat, which is configured such that a seat back thereof may recline, is applied to at least a front seat among the seats disposed in the vehicle. The reclining seat refers to a seat having a backrest that may be adjusted, that is, a seat which is configured such that a user adjusts an angle of the seat back to a predetermined angle in order to reach a comfortable position and/or tilts a backrest maximally to a predetermined angle in order to take a rest or sleep.

In addition to the configuration of the reclining seat, the seat is configured to be slidable so that a position of the seat may be adjusted. Rails, which are configured such that the seat may slide along the rails, are installed under at least the front seat (e.g., a driver seat and a front passenger seat) among the seats disposed in the vehicle, and as a result, the user may arbitrarily adjust the position of the seat forward and rearward.

Meanwhile, recently, as a configuration for improving convenience for a user, a power seat, that is, an automatically adjustable seat is provided in order to easily operate and control the reclining and sliding seat. The power seat is a technology that solves the drawback in the related art that requires the user to directly adjust the seat when reclining and sliding the seat, includes an electrically-powered device such as a motor, and operates the motor by operating a switch or the like, thereby enabling reclining and/or slide control. Typically, an apparatus, which may perform both the reclining control and the slide control, is referred to as a two-way power seat.

However, in the case of the vehicle in which the seats are disposed in two or more rows, because of restrictions on space in the interior of the vehicle, a slide distance which the seat slides forward or rearward is short, and there is a limit in maximally reclining the seat. In addition, because the reclining control and the slide control are performed together, there is a likelihood that a rear end portion of the seat will move toward the rear seat beyond a required position, and for this reason, there is concern that a collision may occur between the front and rear seats and cause passenger injuries, damage to the seats, or damage to various types of mechanisms and devices provided on/in the seats.

SUMMARY

The present invention has been made in an effort to prevent a collision with the rear seat that may occur due to reclining and sliding movements of the seats for a vehicle, and thus ensure safety by allowing reclining control and slide control for seats of the vehicle to be performed in connection with each other, to control a seat back rearward movement angle of a front seat based on a seat back angle of the front seat, a position of a rear seat, and an interval between the front and rear seats at the time of rearward reclining control for the front seat, control a rearward slide movement distance based on the seat back angle of the front seat at the time of rearward slide control for the front seat, and calculate in advance a likelihood that interference will occur between the front and rear seats so as to stop the control operation at the time of performing a rearward reclining control operation and a rearward slide control operation, or perform a forward slide control operation and a forward reclining control operation.

An exemplary embodiment of the present invention provides a system for preventing interference between front and rear seats for a vehicle, which is configured to enable at least the front seat to recline and slide, the system including: a reclining unit which adjusts a seat back angle of the front seat; a slide unit which adjusts forward and rearward slide positions of the front seat; a rear seat position detecting unit which detects a rear seat position; and a control unit which controls operations of the reclining unit and the slide unit, in which the control unit receives the rear seat position from the rear seat position detecting unit, and performs rearward reclining control and rearward slide control within a range in which a seat back of the front seat does not cause interference with the rear seat recognized based on the rear seat position.

The control unit may match and set in advance a seat back limit angle of the front seat with respect to an interval between the front and rear seats indicated by a predetermined unit, and may perform the rearward reclining control within the seat back limit angle, which is matched with respect to the front seat position detected by the slide unit and the interval between the front and rear seats calculated by the rear seat position detecting unit, at the time of the rearward reclining control.

The control unit may match and set in advance a limit interval between the front and rear seats which corresponds to the seat back angle of the front seat indicated by a predetermined unit, and may perform the rearward slide control within the limit interval between the front and rear seats, which is matched with respect to the seat back angle detected by the reclining unit, at the time of the rearward slide control.

The reclining unit may include: a reclining motor which adjusts the seat back angle of the front seat; and a reclining angle sensor which detects the seat back angle of the front seat and transmits the seat back angle of the front seat to the control unit.

The slide unit may include: a slide motor which adjusts the front seat position; and a slide position sensor which detects the front seat position and transmits the front seat position to the control unit.

In addition, the rear seat position detecting unit may include a slide position sensor which detects the rear seat position and transmits the rear seat position to the control unit.

The system may further include an operation unit which is installed to allow a user to input control operations of the reclining unit and the slide unit.

Another exemplary embodiment of the present invention provides a control method for preventing interference between front and rear seats for a vehicle, which is configured to enable at least the front seat to recline and slide, the control method including: inputting a reclining control operation of the front seat from a driver; determining whether the reclining control operation is rearward reclining control; calculating an interval between the front and rear seats by detecting a front seat position and a rear seat position when the rearward reclining control is inputted; detecting a seat back angle of the front seat; and performing the rearward reclining control within a range in which a seat back of the front seat does not cause interference with the rear seat at an interval between the front and rear seats which is calculated from the detected front seat position and the detected rear seat position.

The control method may further include: matching and setting in advance a seat back limit angle of the front seat with respect to the interval between the front and rear seats indicated by a predetermined unit; and performing the rearward reclining control within the seat back limit angle matched with respect to the calculated interval between the front and rear seats.

The control method may further include determining whether the seat back angle of the front seat exceeds the seat back limit angle; and stopping the reclining control when the seat back angle of the front seat exceeds the seat back limit angle.

The control method may further include performing forward slide control at the time of a rearward reclining control operation when the seat back angle of the front seat exceeds the seat back limit angle and the reclining control is stopped.

The control method may further include re-determining whether the seat back angle of the front seat exceeds the seat back limit angle; and re-performing the rearward reclining control when the seat back angle of the front seat does not exceed the seat back limit angle.

The control method may further include inputting a slide control operation of the front seat from the driver; determining whether the slide control operation is rearward slide control; calculating an interval between the front and rear seats by detecting the front seat position and the rear seat position when the rearward slide control is inputted; detecting a seat back angle of the front seat; and performing the rearward slide control within a range in which the front seat position does not cause interference with the rear seat at the detected seat back angle of the front seat.

The control method may further include: matching and setting in advance a limit interval between the front and rear seats which corresponds to the seat back angle of the front seat indicated by a predetermined unit; and performing the rearward slide control within the limit interval between the front and rear seats which is matched with respect to the detected seat back angle of the front seat.

The control method may further include: detecting the front seat position and the rear seat position when the rearward slide control is inputted; calculating an interval between the front and rear seats from the front seat position and the rear seat position; determining whether the interval between the front and rear seats is below the limit interval between the front and rear seats; and stopping the slide control when the interval between the front and rear seats is below the limit interval between the front and rear seats.

The control method may further include: performing forward reclining control at the time of a rearward slide control operation when the interval between the front and rear seats is below the limit interval between the front and rear seats and the slide control is stopped.

The control method may further include: re-determining whether the interval between the front and rear seats is below the limit interval between the front and rear seats; and re-performing the rearward slide control when the interval between the front and rear seats is not below the limit interval between the front and rear seats.

A non-transitory computer readable medium containing program instructions executed by a processor may include: program instructions that input a reclining control operation of a front seat from a driver; program instructions that determine whether the reclining control operation is rearward reclining control; program instructions that calculate an interval between the front seat and a rear set by detecting a front seat position and a rear seat position when the rearward reclining control is inputted; program instructions that detect a seat back angle of the front seat; and program instructions that perform the rearward reclining control within a range in which a seat back of the front seat does not cause interference with the rear seat at an interval between the front and rear seats which is calculated from the detected front seat position and the detected rear seat position.

With the configurations as described above, that is, the configuration in which the reclining control is performed in accordance with the slide position of the front seat or the slide control is performed in accordance with the reclining seat back angle of the front seat, and the configuration in which sections where the reclining control and the slide control for the front seat are performed in connection with each other in accordance with the rear seat position are differently controlled, the present invention provides the reclining control method and the slide control method which allow the seats for a vehicle in the related art to operate separately within a somewhat wide range, thereby providing an advantage in that a problem which causes an injury of an occupant or damage to the seat due to interference between the front and rear seats may be solved. The present invention allows the reclining control and the slide control for the seats of a vehicle to be performed in connection with each other, and allows the operating processes thereof to be performed sequentially or separately, thereby providing advantages in that the user may easily recognize an operational state of the seat for a vehicle, and consequently, the occupant's confusion may be prevented at the time of performing the reclining control and the slide control for the seats of a vehicle.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention relates to a technology that allows reclining control and slide control for seats for a vehicle to be performed in connection with each other, to control a seat back rearward movement angle of a front seat based on a seat back angle of the front seat, a position of a rear seat, and an interval between the front and rear seats at the time of rearward reclining control for the front seat, control a rearward slide movement distance based on the seat back angle of the front seat at the time of rearward slide control for the front seat, and calculate in advance a likelihood that interference will occur between the front and rear seats so as to stop the control operation at the time of performing a rearward reclining control operation and a rearward slide control operation, or perform a forward slide control operation and a forward reclining control operation, thereby preventing a collision with the rear seat that may occur due to reclining and slide movement of the seats for a vehicle, and ensuring safety.

Hereinafter, in the following specific description of technical configurations of the present invention, terms or words used in the specification and the claims should not be interpreted as being limited to a general and dictionary meaning and should be interpreted as a meaning and a concept which conform to the technical spirit of the present invention based on a principle that an inventor can appropriately define a concept of a term in order to describe his/her own invention by the best method. Therefore, the exemplary embodiments disclosed in the present specification and the technical configurations illustrated in the drawings are just the best preferred exemplary embodiments of the present invention and do not fully represent the technical spirit of the present invention. Accordingly, it should be appreciated that various equivalents and modified examples capable of substituting them can be made at the time of filing the present application. In addition, terms used in the present specification are used only to easily describe specific exemplary embodiments, and are not intended to limit the present invention. In addition, it should be understood that singular expressions used herein include plural expressions thereof unless the context clearly dictates otherwise.

Hereinafter, a system and a control method for preventing interference between the front and rear seats for a vehicle according to an exemplary embodiment of the present invention will be described in detail with reference to the accompanying drawings.

Figure 1:
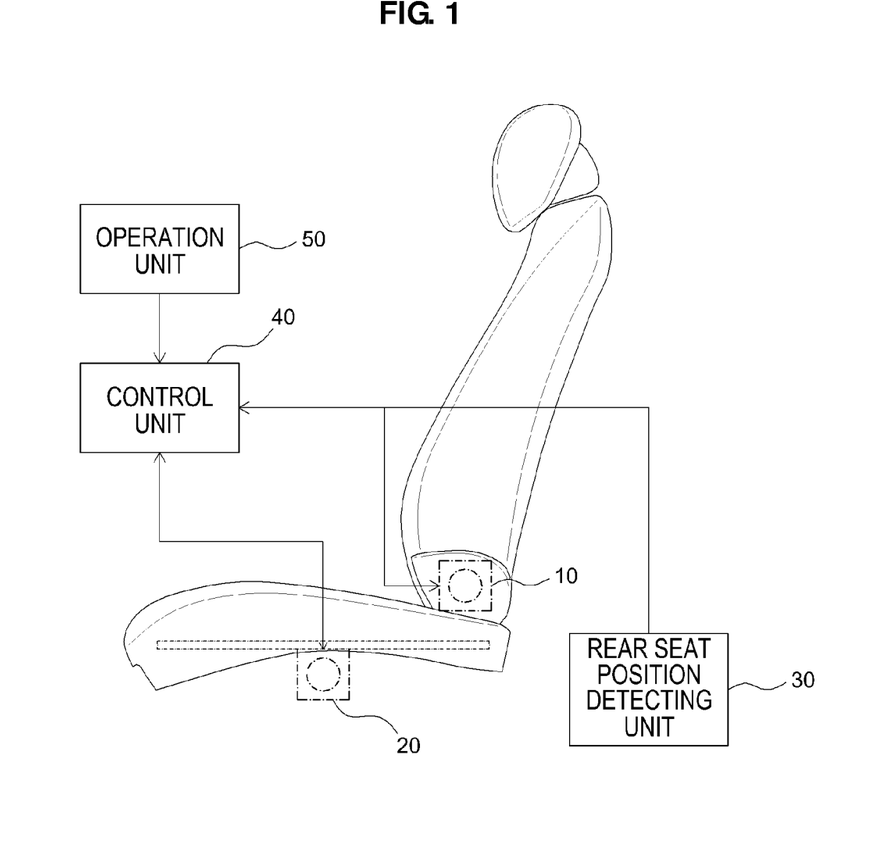
FIG. 1 schematically illustrates a system for preventing interference between front and rear seats for a vehicle according to an exemplary embodiment of the present invention.
Figure 2:
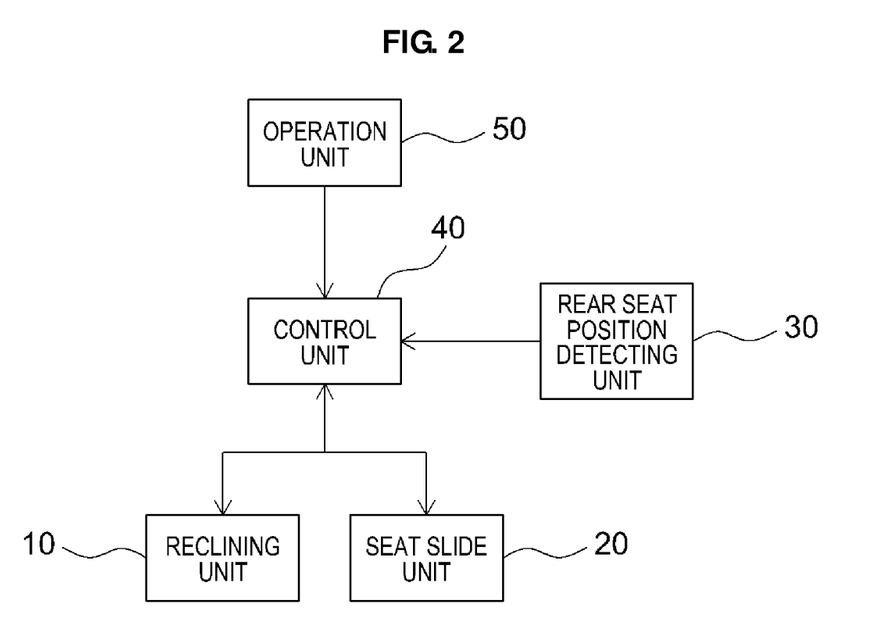
FIG. 2 is a block diagram corresponding to FIG. 1.

FIG. 1 schematically illustrates a system for preventing interference between front and rear seats for a vehicle according to an exemplary embodiment of the present invention, and FIG. 2 is a block diagram corresponding to FIG. 1.

The present invention is applied to a vehicle which is configured to enable at least the front seat to be subjected to reclining and slide control, that is, a vehicle which is configured to enable a driver seat and a front passenger seat to be subjected to reclining and slide control. As illustrated, the present invention includes a reclining unit 10 which adjusts a seat back angle of the front seat, a slide unit 20 which adjusts forward and rearward slide positions of the front seat, a rear seat position detecting unit 30 which detects a rear seat position, a control unit 40 which controls the operations of the reclining unit 10 and the slide unit 20, and an operation unit 50 which is installed to allow a user to input control operations of the reclining unit 10 and the slide unit 20.

The reclining unit 10 is a constituent element which controls a seat back angle of the front seat based on a control operation which is inputted by a driver through the operation unit 50, that is, based on a reclining control operation.

In the exemplary embodiment of the present invention, the reclining unit 10 includes a reclining motor which adjusts a seat back angle of the front seat, and a reclining angle sensor which detects a seat back angle of the front seat and transmits the seat back angle to the control unit 40. The reclining motor is controlled by the control unit 40, and the seat back angle detected by the reclining angle sensor is transmitted to the control unit 40.

The reclining motor and the reclining angle sensor (e.g., a reclining motor hall sensor) are well known, and may be identical to similar elements applied to a known seat that may recline, and because the reclining motor and the reclining angle sensor are well known, detailed descriptions thereof will be omitted.

The slide unit 20 is a constituent element which controls a position of the front seat based on a control operation which is inputted by the driver through the operation unit 50, that is, based on a slide control operation.

In the exemplary embodiment of the present invention, the slide unit 20 includes a slide motor which adjusts a position of the front seat, and a slide position sensor which detects a position of the front seat and transmits the position of the front seat to the control unit 40. The slide motor is controlled by the control unit 40, and the position of the front seat, which is detected by the slide position sensor, is transmitted to the control unit 40.

The slide motor and the slide position sensor (e.g., a slide motor hall sensor) are well known, and may be identical to similar elements of a known seat configured to be slidable, and because the slide motor and the slide position sensor are well known, detailed descriptions thereof will be omitted.

The rear seat position detecting unit 30 is a constituent element for detecting a position of the rear seat (in the exemplary embodiment of the present invention, the rear seat is regarded at least as being, but not limited to being, slidable forward and rearward), and includes a slide position sensor (e.g., a slide motor hall sensor) which detects a position of the rear seat and transmits the position of the rear seat to the control unit 40. The position of the rear seat, which is detected by the slide position sensor included in the rear seat position detecting unit 30, is transmitted to the control unit 40.

The control unit 40 is configured to control the operations of the reclining unit 10 and the slide unit 20, and to control a rearward reclining control operation of the reclining unit 10 and a rearward slide operation of the slide unit 20 in order to perform rearward reclining control and rearward slide control within a range in which interference does not occur between the front and rear seats, which is the technical object of the present invention. In addition, to perform the aforementioned control, the control unit 40 may be operated in conjunction with a control unit provided in the vehicle, for example, a body control module (BCM). The control unit 40 may include a publicly known control device, for example, an electronic control unit (ECU), and a detailed description of an exemplary embodiment or a configuration thereof will be omitted.

The operation unit 50 is provided in the interior of the vehicle, and may include any publicly known input device. A control operation input produced by the operation unit 50 is transmitted to the control unit 40. In the exemplary embodiment of the present invention, the operation unit 50 includes at least two or more operation controls which are allocated to perform the reclining control and the slide control, respectively. However, it will be apparently understood by those skilled in the art that the present invention is not limited to the number and the form of operation controls.

In the exemplary embodiment of the present invention, the control unit 40 receives a control operation which is inputted by the user through the operation unit 50, and controls the reclining unit 10 and the slide unit 20 based on the control operation.

When the control unit 40 receives the control operation, the control unit 40 first receives the rear seat position from the rear seat position detecting unit 30 prior to determining whether the control operation is the reclining control or the slide control, and performs the rearward reclining control and the rearward slide control within a range in which the seat back of the front seat does not cause interference with the rear seat which is recognized based on the rear seat position.

It should be noted that the term 'interference' as used herein is commonly indicative of all possible situations such as a collision, friction, obstruction, and proximity, in which the movement of the front seat is restricted or hindered by the rear seat due to the control of the front seat or the front seat collides with the rear seat and thus may be damaged.

The control unit 40 performs the following two operations in order to perform the rearward reclining control and the rearward slide control within a range in which the seat back of the front seat does not cause interference with the rear seat calculated based on the rear seat position.

1) The control unit 40 matches and sets in advance a seat back limit angle of the front seat which corresponds to a front seat position and a rear seat position (i.e., an interval between the front and rear seats) indicated by a predetermined unit, and at the time of the rearward reclining control, the control unit 40 performs the rearward reclining control within a seat back limit angle which is matched with respect to the front seat position detected by the slide unit 20 and the rear seat position detected by the rear seat position detecting unit 30.

2) The control unit 40 matches and sets in advance a limit interval between the front and rear seats which corresponds to a seat back angle of the front seat which is indicated by a predetermined unit, and at the time of the rearward slide control, the control unit 40 performs the rearward slide control within the limit interval between the front and rear seats which is matched with respect to the seat back angle detected by the reclining unit 10.

The aforementioned matters may be more easily understood by a control method for preventing interference between the front and rear seats for a vehicle, which will be described hereinafter.

Figure 3:
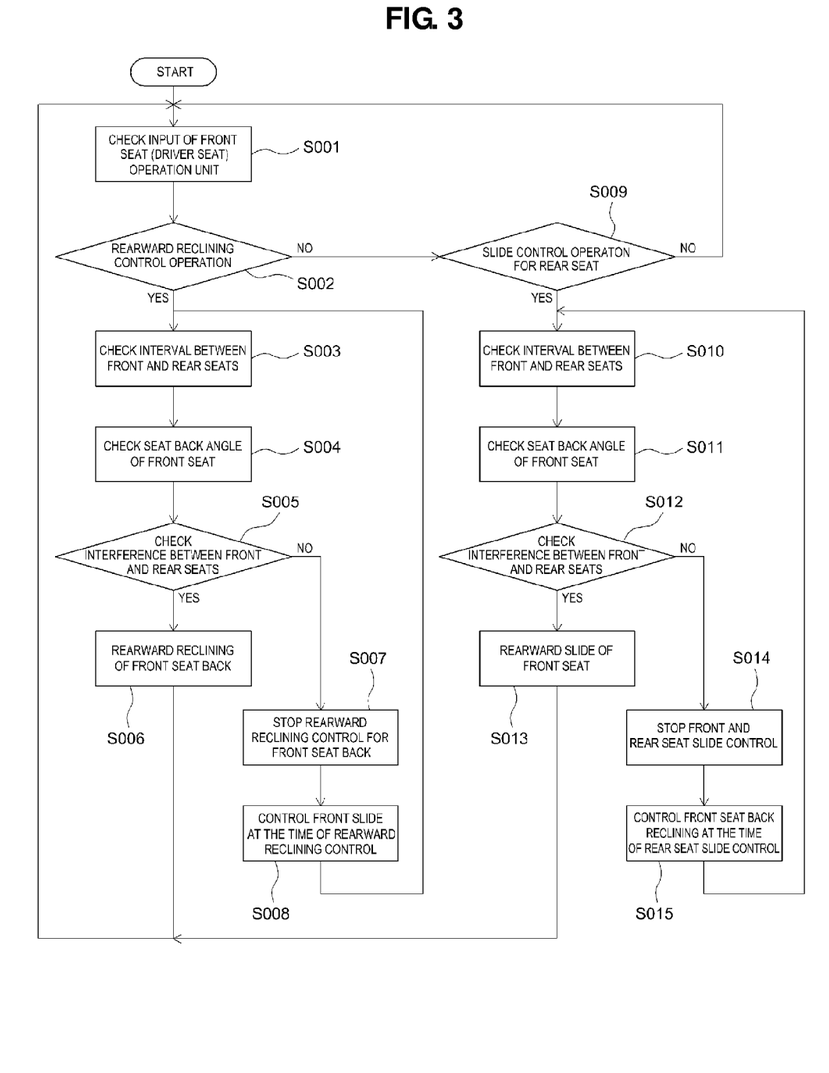
FIG. 3 is a flowchart illustrating a rearward reclining control operation and a rearward slide control operation of a control method for preventing interference between the front and rear seats for a vehicle according to the exemplary embodiment of the present invention.

FIG. 3 is a flowchart illustrating a rearward reclining control operation and a rearward slide control operation of a control method for preventing interference between the front and rear seats for a vehicle according to the exemplary embodiment of the present invention.

As illustrated in FIG. 3, during the rearward reclining control operation, the reclining control operation for the front seat is first inputted to the control unit 40 by the driver (or an occupant, hereinafter referred to as a 'driver' for convenience of description) (S001). As described above, the control operation by the driver is performed by the operation unit 50 provided in the driver seat.

When the control operation by the driver is inputted to the control unit 40, the control unit 40 preferentially determines whether the received control operation is the rearward reclining control (S002). An object of the present invention is to prevent interference between the front and rear seats, and as a result, this step is performed to prevent resource consumption caused by unnecessary control calculation because the forward reclining control for the front seat does not cause interference with the rear seat.

When the control unit 40 determines that the inputted control operation is the rearward reclining control, the control unit 40 receives the rear seat position detected by the rear seat position detecting unit 30 and detects the rear seat position prior to controlling the seat back of the front seat rearward. In addition, when the control unit 40 detects the rear seat position, the control unit 40 receives the front seat position from the slide unit 20 and detects the front seat position. With the detected rear seat position and front seat position, the control unit may calculate an interval between front and rear seats which is currently set (S003). In addition, when the control unit 40 detects the rear seat position, the control unit 40 receives the seat back angle of the front seat from the reclining unit 10 and detects the seat back angle of the front seat (S004).

Therefore, the control unit 40 determines whether no interference occurs between the front and rear seats by using the interval between the front and rear seats which is calculated based on the front seat position and the rear seat position detected in the aforementioned steps and the seat back angle of the reclining seat which is detected in the aforementioned steps (S005).

This step is performed by preferentially performing, by the control unit 40, the process of matching and setting in advance the front seat position and the rear seat position indicated by a predetermined unit, that is, the interval between the front and rear seats and the seat back limit angle of the front seat, and by determining whether the seat back angle is within the seat back limit angle matched with respect to the front seat position and the rear seat position which are detected in the steps S003 and S004.

If it is determined in this step that no interference occurs between the front and rear seats, the control unit 40 normally performs the rearward reclining control, that is, controls the seat back angle of the front seat so that the seat back angle of the front seat is directed rearward (S006).

However, if it is determined in this step that interference may occur between the front and rear seats, that is, if the seat back angle of the front seat exceeds the seat back limit angle, the control unit 40 stops the reclining control (S007), and then performs the forward slide control at the time of the rearward reclining control operation (S008).

In other words, when the control unit 40 determines that interference may occur between the front and rear seats, the control unit 40 forcedly stops the control operation of allowing the seat back angle of the front seat to be directed rearward, thereby inhibiting a likelihood that interference will occur. Thereafter, if the driver inputs the rearward reclining control operation (i.e., if the driver intends to allow the seat back to be directed further rearward), the control unit 40 allows the front seat to slide forward instead of performing the rearward reclining control for the seat back, thereby preferentially ensuring an interval between the front and rear seats.

The reclining control and the slide control according to the control operations performed in steps S001 to S008 may be performed by a predetermined unit, but it should be noted that the unit is not specified.

Thereafter, the control unit 40 performs a step of re-determining whether the seat back angle of the front seat exceeds the seat back limit angle (S001). This step is a step for re-determining a likelihood that interference will occur between the front and rear seats by performing the steps S001 to S008 after performing the step S008, that is, after the control unit 40 is allowed to perform the forward slide control when the rearward reclining control operation is inputted.

In other words, the control unit 40 changes a control mode such that the forward slide control is performed when the rearward reclining control operation is inputted, and then re-detects the front seat position, the rear seat position, and the seat back angle of the reclining seat, and re-determines whether no interference occurs between the front and rear seats using the front seat position, the rear seat position, and the seat back angle of the reclining seat.

This step is also performed by determining whether the currently detected seat back angle of the front seat is within the seat back limit angle which is matched with respect to the front seat position and the rear seat position detected by the control unit 40.

Thereafter, when it is determined that the seat back angle of the front seat does not exceed the seat back limit angle, the control mode of the control unit 40 is changed again such that normal control is performed by performing the rearward reclining control when the rearward reclining control operation is inputted.

Meanwhile, when the control unit 40 determines in the step S002 that the received control operation is not the rearward reclining control, the control unit 40 determines whether the received control operation is the rearward slide control (S009). Like step S002, an object of the present invention is to prevent interference between the front and rear seats, and as a result, this step is performed to prevent resource consumption caused by unnecessary control calculation because the forward slide control for the front seat does not cause interference with the rear seat.

When the control unit 40 determines that the inputted control operation is the rearward slide control, the control unit 40 receives the front seat position detected by the slide unit 20 and the rear seat position detected by the rear seat position detecting unit 30 and then detects the interval between the front and rear seats prior to controlling the front seat to slide the front seat rearward slide rearward (S010). In addition, after the control unit 40 detects the rear seat position, the control unit 40 receives the seat back angle of the front seat from the reclining unit 10 and detects the seat back angle of the front seat (S011).

Therefore, the control unit 40 determines whether no interference occurs between the front and rear seats by using the front seat position, the rear seat position, and the seat back angle of the reclining seat which are detected in the aforementioned steps (S012).

This step is performed by preferentially performing, by the control unit 40, the process of matching and setting in advance the limit interval between the front and rear seats which corresponds to the seat back angle of the front seat indicated by a predetermined unit, and by determining whether the interval between the front and rear seats, which is detected in the steps S010 and S011, is within the limit interval between the front and rear seats which is matched with respect to the detected seat back angle of the front seat.

If it is determined in this step that no interference occurs between the front and rear seats, the control unit 40 normally performs the rearward slide control, that is, controls the front seat position to slide rearward (S013).

However, if it is determined in this step that interference may occur between the front and rear seats, that is, if the interval between the front and rear seats which is calculated based on the front seat position and the rear seat position exceeds the limit interval between the front and rear seats, the rearward slide control is stopped (S014), and then the control mode is changed such that the forward reclining control is performed at the time of the rearward slide control operation (S015).

In other words, when the control unit 40 determines that interference may occur between the front and rear seats during the rearward slide control, the control unit 40 forcedly stops the rearward slide control, thereby inhibiting a likelihood that interference will occur. Thereafter, if the driver inputs the rearward slide control operation (i.e., if the driver intends to further slide the front seat rearward), the control unit 40 tilts the seat back of the front seat forward instead of performing the rearward slide control for the front seat, thereby preferentially ensuring the interval between the front and rear seats.

The slide control according to the control operation performed in steps S009 to S015 may also be performed by a predetermined unit, but it should be noted that the unit is not specified.

Thereafter, the control unit 40 performs a step of re-determining whether the interval between the front and rear seats is within the limit interval between the front and rear seats (S009). This step is a step for re-determining whether interference will occur between the front and rear seats by re-performing steps S009 to S015 after performing step S015, that is, after the control mode is changed such that the control unit 40 performs the forward reclining control when the rearward slide control operation is inputted.

In other words, the control unit 40 changes the control mode such that the forward reclining control is performed when the rearward slide control operation is inputted, and then re-detects the front seat position, the rear seat position, and the seat back angle of the reclining seat, and re-determines whether no interference occurs between the front and rear seats using the front seat position, the rear seat position, and the seat back angle of the reclining seat.

This step is also performed by determining whether the interval between the front and rear seats, which is currently detected by the control unit 40, is below the limit interval between the front and rear seats which is matched with respect to the current front seat position and the current rear seat position.

Thereafter, when it is determined that the current interval between the front and rear seats exceeds the limit interval between the front and rear seats, the control mode of the control unit 40 is changed such that normal control is performed by re-performing the rearward slide control.

Figure 4:
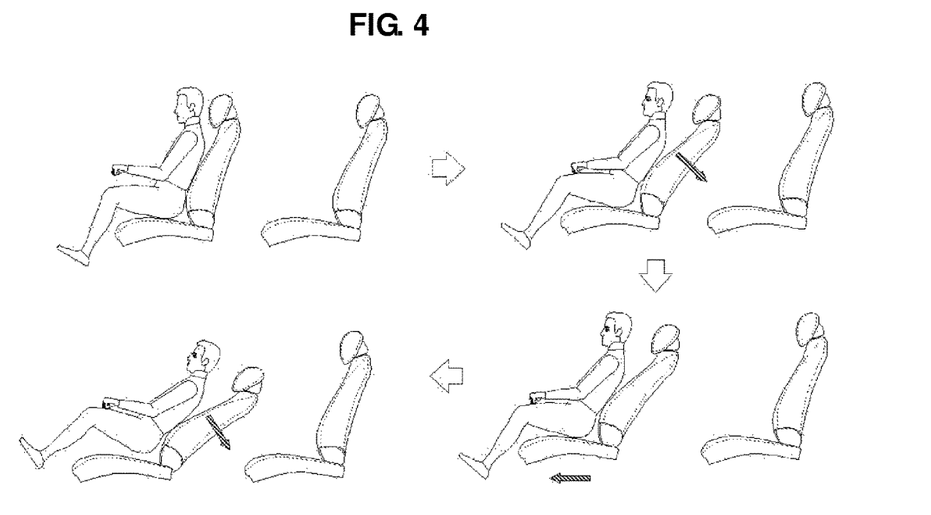
FIG. 4 illustrates the rearward reclining control operation according to the present invention.
Figure 5:
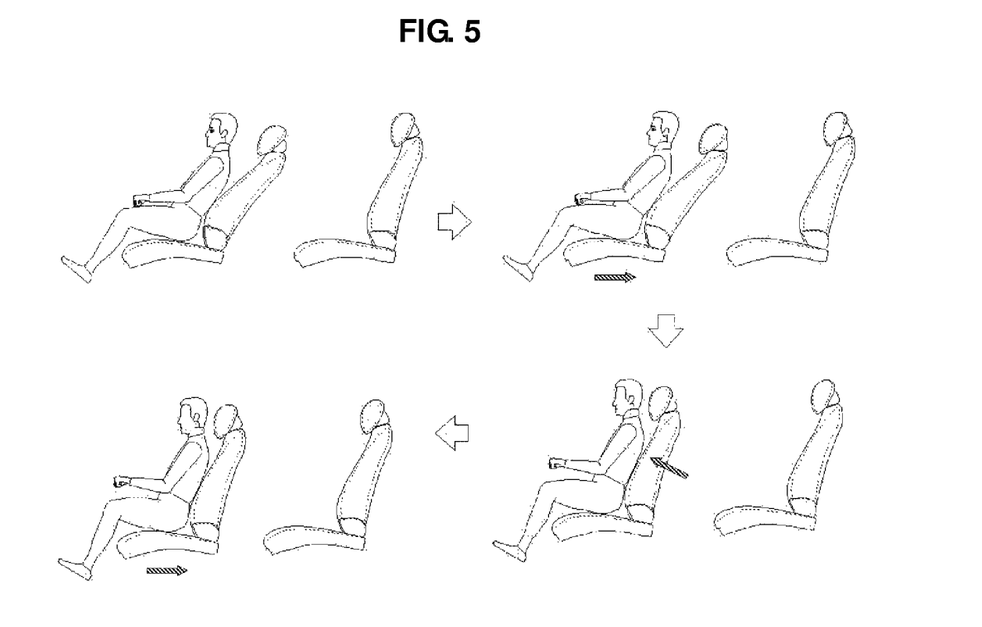
FIG. 5 illustrates the rearward slide control operation according to the present invention.

FIGS. 4 and 5 illustrate an exemplary embodiment illustrating the rearward reclining control operation and the rearward slide control operation according to the present invention which has the configurations as described above.

As illustrated in FIG. 4, when the rearward reclining control operation is initially performed, the seat back reclines rearward, and in a case in which a likelihood of interference is predicted, the rearward reclining operation of the seat back is stopped, and then the front seat slides forward instead of the rearward reclining operation of the seat back even though the rearward reclining control operation is performed. Thereafter, if a likelihood of interference is eliminated, the normal rearward reclining control operation is performed.

On the contrary, as illustrated in FIG. 5, when the rearward slide control operation is initially performed, the front seat slides rearward, and in a case in which a likelihood of interference is predicted, the rearward sliding operation of the front seat is stopped, and then the seat back reclines forward instead of the rearward sliding operation of the front seat even though the rearward slide control operation is performed. Thereafter, if a likelihood of interference is eliminated, the normal rearward slide control operation is performed.

The respective steps illustrated in FIGS. 4 and 5 may be performed by a predetermined unit (control time, a movement angle, or a movement distance, etc.) as described above.

With the configurations as described above, that is, the configuration in which the reclining control is performed in accordance with the slide position of the front seat or the slide control is performed in accordance with the seat back angle of the front seat, and the technical configuration in which sections where the front seat slide control and the reclining control are performed in connection with each other in accordance with the rear seat position are different, the present invention provides the reclining control method and the slide control method which allow the seats for a vehicle in the related art to operate separately within a somewhat wide range, thereby providing an advantage in that a problem which causes an injury of an occupant or damage to the seat due to interference between the front and rear seats may be solved. The present invention allows the reclining control and the slide control for the seats of a vehicle to be performed in connection with each other, and allows the operating processes thereof to be performed sequentially or separately, thereby providing advantages in that the user may easily recognize an operational state of the seat for a vehicle, and consequently, the occupant's confusion may be prevented at the time of the reclining control and the slide control for the seats for a vehicle.

While the exemplary embodiments of the system and the control method for preventing interference between the front and rear seats for a vehicle according to the present invention have been described above, the exemplary embodiments of the present invention merely suggest specific examples for better understanding of the present invention, but are not intended to limit the scope of the present invention. It is obvious to those skilled in the technical field to which the present invention pertains that in addition to the exemplary embodiments disclosed herein, various modifications may be implemented based on the technical spirit of the present invention.

What is claimed is:

1. A system for preventing interference between front and rear seats for a vehicle, which is configured to enable at least the front seat to recline and slide, the system comprising:

a reclining unit which adjusts a seat back angle of the front seat;

a slide unit which adjusts forward and rearward slide positions of the front seat;

a rear seat position detecting unit which detects a rear seat position; and a control unit which controls operations of the reclining unit and the slide unit, wherein the control unit receives the rear seat position from the rear seat position detecting unit, and performs rearward reclining control and rearward slide control within a range in which a seat back of the front seat does not cause interference with the rear seat recognized based on the rear seat position, wherein the control unit matches and sets in advance a seat back limit angle of the front seat with respect to an interval between the front and rear seats indicated by a predetermined unit, and performs the rearward reclining control within the seat back limit angle, which is matched with respect to the front seat position detected by the slide unit and the interval between the front and rear seats calculated by the rear seat position detecting unit, at the time of the rearward reclining control, wherein the unit matches and sets in advance a limit interval between the front and rear seats which corresponds to the seat back angle of the front seat indicated by a predetermined unit, and performs the rearwards slide control within the limit interval between the front and rear seats, which is matched with respect to the seat back angle detected by the reclining unit, at the time of the rearward slide control, and wherein the slide unit includes:
  a slide motor which adjusts the front seat position; and
  a slide position sensor which detects the front seat position and transmits the front seat position to the control unit.

2. The system of claim 1, wherein the reclining unit includes:
  a reclining motor which adjusts the seat hack angle of the front seat; and
  a reclining angle sensor which detects the seat back angle of the front seat and transmits the seat back angle of the front seat to the control unit.

3. The system of claim 1, wherein the rear seat position detecting unit includes a slide position sensor which detects the rear seat position and transmits the rear seat position to the control unit.

4. The system of claim 1, further comprising:
  an operation unit which is installed to allow a user to input control operations of the reclining unit and the slide unit.

5. A control method for preventing interference between front and rear seats for a vehicle, which is configured to enable at least the front seat to recline and slide, the control method comprising:
  inputting, by a control unit, a reclining control operation of the front seat from a driver;
  determining, by the control unit, whether the reclining control operation is rearward reclining control;
  calculating, by the control unit, an interval between the front and rear seats by detecting a front seat position and a rear seat position when the rearward reclining control is inputted;
  detecting, by the control unit, a seat back angle of the front seat;
  performing, by the control unit, the rearward reclining control within a range in which a seat back of the front seat does not cause interference with the rear seat at an interval between the front and rear seats which is calculated from the detected front seat position and the detected rear seat position;
  inputting, by control unit, a slide control operation of the front seat from the driven;
  determining, by the control unit, whether the slide control operation is rearward slide control;
  calculating, by the control unit an interval between the front and rear seats by detecting the front seat position and the rear scat position when the rearward slide control is inputted;
  detecting, by the control unit, a scat back angle of the front seat; and
  performing, by the control unit, the rearward slide control within a range in which the front seat position does not cause interference with the rear seat at the detected seat back angle of the front seat.

6. The control method of claim 5, further comprising:
  matching and setting in advance, by the control unit, a seat back limit angle of the front seat with respect to the interval between the front and rear seats indicated by a predetermined unit; and
  performing, by the control unit, the rearward reclining control within the seat back limit angle matched with respect to the calculated interval between the front and rear seats.

7. The control method of claim 6, further comprising:
  determining, by the control unit, whether the seat back angle of the front seat exceeds the seat back limit angle; and
  stopping, by the control unit, the reclining control when the seat back angle of the front seat exceeds the seat back limit angle.

8. The control method of claim 7, further comprising:
  performing, by the control unit, forward slide control at the time of a rearward reclining control operation when the seat back angle of the front seat exceeds the seat back limit angle and the reclining control is stopped.

9. The control method of claim 8, further comprising:
  re-determining, by the control unit, whether the seat back angle of the front seat exceeds the seat back limit angle; and
  re-performing, by the control unit, the rearward reclining control when the seat back angle of the front seat does not exceed the seat back limit angle.

10. The control method of claim 5, further comprising:
  matching and setting in advance, by the control unit, a limit interval between the front and rear seats which corresponds to the seat back angle of the front seat indicated by a predetermined unit; and
  performing, by the control unit, the rearward slide control within the limit interval between the front and rear seats which is matched with respect to the detected seat back angle of the front seat.

11. The control method of claim 10, further comprising:
  detecting, by the control unit, the front seat position and the rear seat position when the rearward slide control is inputted;
  calculating, by the control unit, an interval between the front and rear seats from the front seat position and the rear seat position;
  determining, by the control unit, whether the interval between the front and rear seats is below the limit interval between the front and rear seats; and
  stopping, by the control unit, the slide control when the interval between the front and rear seats is below the limit interval between the front and rear seats.

12. The control method of claim 11, further comprising:
  performing, by the control unit, forward reclining control at the time of a rearward slide control operation when the interval between the front and rear seats is below the limit interval between the front and rear seats and the slide control is stopped.

13. The control method of claim 12, further comprising:
  re-determining, by the control unit, whether the interval between the front and rear seats is below the limit interval between the front and rear seats; and
  re-performing, by the control unit, the rearward slide control when the interval between the front and rear seats is not below the limit interval between the front and rear seats.

14. A non-transitory computer readable medium containing program instructions executed by a processor, the computer readable medium comprising:
  program instructions that input a reclining control operation of a front seat from a driver;
  program instructions that determine whether the reclining control operation is rearward reclining control;
  program instructions that calculate an interval between the front seat and a rear set by detecting a front seat position and a rear seat position When the rearward reclining control is inputted;
  program instructions that detect a seat back angle of the front seat;
  program instructions that perform the rearward reclining control within a range in which a seat back of the front seat does not cause interference with the rear seat at an interval between the front and rear seats which is calculated from the detected front seat position and the detected rear seat position;
program instructions that input a slide control operation o the front seat rom the driver;
program instructions that determine whether the slide control operation is rearward slide control;
program instructions that calculate an interval between the front and rear seats by detecting the front seat position and the rear seat position When the rearward slide control is inputted;
program instructions that detect a seat back angle of the front seat; and
program instructions that perform the rearward slide control within a range in which the front seat position does not cause interference with the rear seat at the detected seat back angle of the front seat.

* * * * *